June 11, 1929.  J. S. THOMPSON  1,716,392
FRICTION BRAKE
Filed April 7, 1926
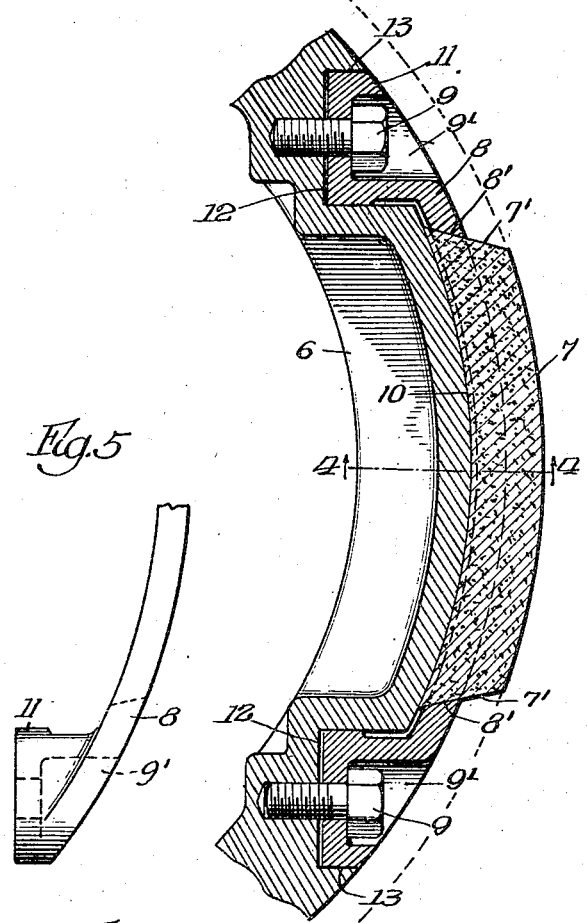
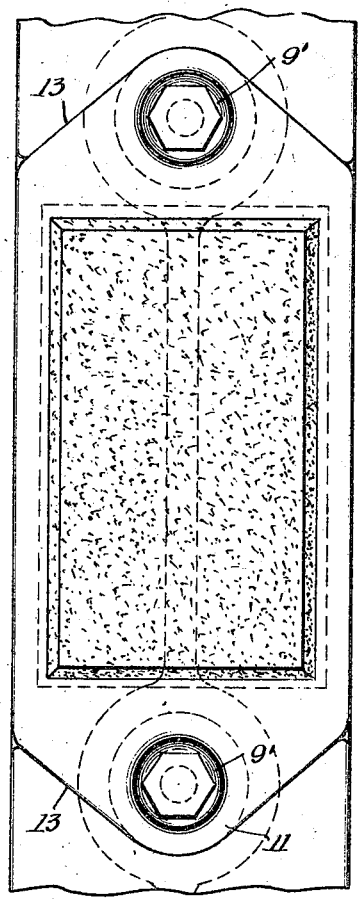
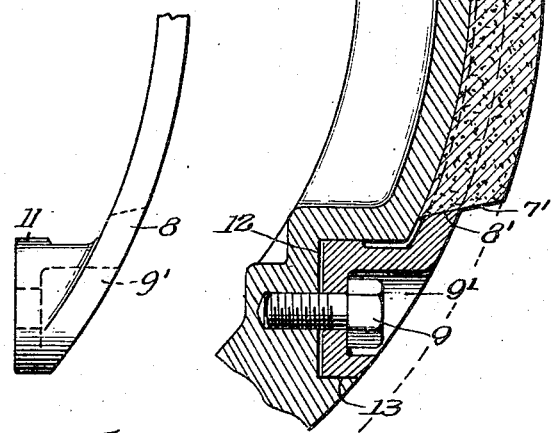
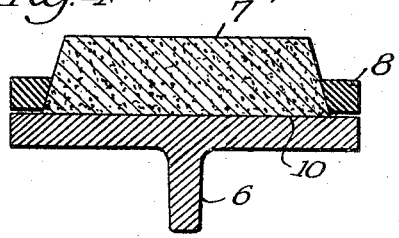
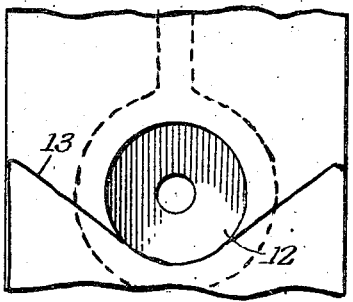

Patented June 11, 1929.

1,716,392

UNITED STATES PATENT OFFICE.

JAMES S. THOMPSON, OF NEW YORK, N. Y., ASSIGNOR TO AMERICAN BRAKE MATERIALS CORPORATION, OF NEW YORK, N. Y., A CORPORATION OF NEW YORK.

FRICTION BRAKE.

Application filed April 7, 1926. Serial No. 100,298.

This invention relates to friction brakes and while it is particularly adapted for expanding brakes arranged to make frictional contact with a drum, which is a form of brake commonly employed in automotive vehicles, it is also useful in many other installations as will be apparent to those skilled in the art.

The object of the invention is to provide a simple means for rigidly securing a brake shoe in proper position on a brake head.

And a further object of the invention is to provide fastening means of simple construction to facilitate replacement of a brake shoe on a brake head.

And a still further object is to provide a simple means for fastening a shoe without marginal projections to a brake head.

In the accompanying drawings I have illustrated a selected embodiment of the invention and referring thereto;

Fig. 1 is a sectional view showing part of a brake head with a shoe secured in place thereon.

Fig. 2 is a plan view of Fig. 1.

Fig. 3 is a plan view of a portion of a head with the shoe and its keeper removed.

Fig. 4 is a sectional view on the line 4—4 of Fig. 1.

Fig. 5 is a detail view of a portion of the keeper.

Referring to the drawings 6 is the brake head, 7 is the brake shoe, 8 is the keeper and 9 are the bolts for fastening the keeper to the head.

The head may be made in any shape adapted for a particular friction brake and, as the head may vary in shape so far as this invention is concerned, I have shown only that portion of a head which supplies the arcuate seat 10 for the shoe. The shoe is also arcuate in shape and is preferably heat resistant and wear resistant. I prefer to employ a composition shoe, but so far as this invention is concerned it may be made of any suitable material.

The keeper is made in the form of a rectangular yoke and a convenient means for engaging the yoke with the shoe is provided by beveling the sides and ends of the shoe at 7' and correspondingly beveling the sides and ends of the yoke at 8' to engage the beveled sides and ends of the shoe. For some purposes it may be sufficient to bevel the sides only, or the ends only, of the shoe and correspondingly bevel the yoke. The keeper has socket members 11 at its ends to engage sockets 12 in the head and for convenience of manufacture I prefer to make the socket members 11 and the sockets 12 circular in form and complementary to each other. The ends of the keeper engage shoulders 13 on the heads and these ends are conveniently made tapered, as shown in Fig. 2. The heads of the bolts 9 are seated in the recesses 9' of the socket members below the plane of the outer face of the head so that the shoe may be worn down close to the head without engaging the bolts.

My invention enables the use of a shoe without any means except its marginal faces for engagement with the devices which secure it to the head; and I may use a shoe without a steel back of any kind, or with a steel back if desired. The bevel engagement of the keeper with the shoe provides a simple means for securing said parts together upon the shoe seat without necessitating any special fitting or engaging of any small or loose parts, and when the shoe and the keeper are applied to the head the bolts can be tightened to secure the parts rigidly in place upon the head. These bolts are located below the plane of the outer face of the head so that they will not contact with the brake drum when the shoe becomes worn. The sockets in the head are parallel and the socket members on the keeper are parallel and the bolts are parallel, so that all of these parts can be easily assembled and removed to replace a shoe. This parallel disposition of the parts avoids the necessity of any extreme nicety of fit, but it will be desirable to machine the interengaging parts and this is facilitated by making the sockets and the socket members circular. The engagement of the socket members with the walls of the sockets will hold the keeper against longitudinal or lateral displacement and the bolts secure the keeper to the head and the shoe against its seat. There is a clearance between the keeper and the head at the yoke and at its ends to permit the keeper to be tightly secured to the head.

Changes in the form, construction and arrangement of parts may be made to adapt the invention for different friction brakes and I reserve the right to make all such changes as fall within the scope of the following claims:

I claim:

1. In a friction brake, the combination of a brake head, a friction shoe, a keeper having a bevel engagement with the periphery of the shoe, and means for securing the keeper to the head.

2. In a friction brake, the combination of a brake head, a friction shoe, a keeper in the form of a yoke having a bevel engagement with the shoe, and means for securing the keeper to the head.

3. In a friction brake, the combination of a brake head, a friction shoe having bevel sides and ends, a keeper in the form of a yoke having beveled surfaces to engage the sides and ends of the shoe, and means for securing the keeper to the head.

4. In a friction brake, the combination of a brake head, a friction shoe, a keeper engaging the shoe, depressed portions at the ends of the keeper seated in the head, at the ends of the shoe, and means engaging said depressed portions for securing the keeper to the head.

5. In a friction brake, the combination of a brake head having sockets therein, a friction shoe, a keeper engaging the shoe and having socket members seated in said sockets, and fastening means engaging said socket members for securing the keeper to the head.

6. In a friction brake, the combination of a brake head having circular sockets therein, a friction shoe, a keeper engaging the shoe and having circular socket members to engage said sockets, and fastening means engaging said socket members for securing the keeper to the head.

7. In a friction brake, the combination of a brake head having sockets therein, a friction shoe, a keeper engaging the shoe and having socket members to engage said sockets and having recesses therein, and fastening means seated in said recesses for securing the keeper to the head.

8. In a friction brake, the combination of a brake head having a shoe seat and sockets at the margin of said seat, a friction shoe, a keeper engaging the shoe and having socket members seated in said sockets to prevent displacement of the keeper, and fastening means arranged in said socket members for securing the keeper to the head.

9. In a friction brake, the combination of a brake head, a friction shoe, a keeper engaging oppositely disposed parts of the shoe, and parallel disposed fastening means for securing the keeper to the head.

10. In a friction brake, the combination of a brake head, a friction shoe, a keeper engaging the shoe and having projecting ends, and parallel disposed fastening means at said ends for securing the keeper to the head.

11. In a friction brake, the combination of a brake head, a friction shoe, a keeper engaging oppositely disposed parts of the shoe, and parallel disposed bolts for securing the keeper to the head.

12. In a friction brake, the combination of a brake head having a shoe seat and parallel sockets at the margin of said seat, a keeper engaging the shoe and having socket members seated in said sockets, and parallel disposed fastening means engaging said socket members and securing the keeper to the head.

13. In a friction brake, the combination of a brake head having parallel sockets therein, a friction shoe having bevel sides, a keeper in the form of a yoke with bevel edges engaging said bevel sides of the shoe, parallel socket members on said yoke engaging said sockets, parallel fastening means engaging the socket members for securing the keeper to the head, and shoulders on the head to be engaged by the ends of said member.

14. In a friction brake, the combination of a brake head, a friction shoe seated on the head, a skeleton keeper, and means for securing the keeper to the head, said keeper engaging the periphery of the shoe to hold it seated on the head.

15. In a friction brake, the combination of a brake head, a friction shoe, a skeleton keeper, and means for securing the keeper to the head, said keeper engaging the sides of the shoe to hold the shoe seated on the head.

16. In a friction brake, the combination of a brake head, a friction shoe, a keeper engaging both sides of the shoe, and means for securing the keeper to the head.

17. In a friction brake, the combination of a brake head, a friction shoe, a keeper engaging both ends and both sides of the shoe, and means for securing the keeper to the head.

18. In a friction brake the combination of a brake head having recesses therein, a brake shoe, a keeper engaging the shoe and having ends in said recesses, there being a clearance between the ends and the bottom of the recesses, and means for securing the keeper to the head.

JAMES S. THOMPSON.